(12) United States Patent
Hvam et al.

(10) Patent No.: US 10,597,332 B2
(45) Date of Patent: Mar. 24, 2020

(54) METHOD OF PRODUCING A BODY COMPRISING POROUS ALPHA SILICON CARBIDE AND THE BODY PRODUCED BY THE METHOD

(71) Applicants: Syddansk Universitet, Odense M (DK); Dinex A/S, Middelfart (DK)

(72) Inventors: Jeanette Hvam, Odense C (DK); Terence Edwin Warner, Odense SV (DK); Thomas Wolff, Munchberg (DE)

(73) Assignees: Syddansk Universitet (DK); Dinex A/S (DK)

(*) Notice: Subject to any disclaimer, the term of this patent is extended or adjusted under 35 U.S.C. 154(b) by 0 days.

(21) Appl. No.: 15/755,033

(22) PCT Filed: Aug. 24, 2016

(86) PCT No.: PCT/DK2016/050285
§ 371 (c)(1),
(2) Date: Feb. 23, 2018

(87) PCT Pub. No.: WO2017/032382
PCT Pub. Date: Mar. 2, 2017

(65) Prior Publication Data
US 2018/0257994 A1    Sep. 13, 2018

(30) Foreign Application Priority Data
Aug. 25, 2015 (EP) .................... 15182296

(51) Int. Cl.
*C04B 35/573* (2006.01)
*B01J 35/04* (2006.01)
(Continued)

(52) U.S. Cl.
CPC ........ *C04B 35/573* (2013.01); *B01D 46/2429* (2013.01); *B01J 27/224* (2013.01);
(Continued)

(58) Field of Classification Search
CPC ................ C04B 35/565; C04B 35/573; C04B 35/62655; C04B 41/009; C04B 41/5059;
(Continued)

(56) References Cited

U.S. PATENT DOCUMENTS 4,756,895 A    7/1988 Boecker et al.
4,777,152 A    10/1988 Tsukada
(Continued)

FOREIGN PATENT DOCUMENTS

DE    10 2013 005 390    3/2013
EP    0336883    10/1989
(Continued)

OTHER PUBLICATIONS

Elkem AS Silicon Materials Product Data Sheet, "Silgrain MicronCut", Dec. 2015.
(Continued)

*Primary Examiner* — Noah S Wiese
(74) *Attorney, Agent, or Firm* — Buchalter

(57) ABSTRACT

The present invention relates to a method of producing porous alpha-SiC containing shaped body and porous alpha-SiC containing shaped body produced by that method. The porous alpha-SiC containing shaped body shows a characteristic microstructure providing a high degree of mechanical stability.

8 Claims, 13 Drawing Sheets

(51) Int. Cl.

| | |
|---|---|
| *C04B 41/00* | (2006.01) |
| *B01J 27/224* | (2006.01) |
| *C04B 41/87* | (2006.01) |
| *F23J 15/02* | (2006.01) |
| *B01J 35/02* | (2006.01) |
| *B01D 46/24* | (2006.01) |
| *C04B 41/50* | (2006.01) |
| *B01J 35/10* | (2006.01) |
| *B01J 37/00* | (2006.01) |
| *B01J 37/08* | (2006.01) |
| *F01N 3/022* | (2006.01) |
| *C04B 111/00* | (2006.01) |
| *B01J 23/72* | (2006.01) |
| *B01J 27/138* | (2006.01) |
| *F23C 13/08* | (2006.01) |
| *F01N 3/035* | (2006.01) |

(52) U.S. Cl.
CPC ............ *B01J 35/023* (2013.01); *B01J 35/04* (2013.01); *B01J 35/1076* (2013.01); *B01J 37/0018* (2013.01); *B01J 37/084* (2013.01); *C04B 41/009* (2013.01); *C04B 41/0072* (2013.01); *C04B 41/5035* (2013.01); *C04B 41/87* (2013.01); *F23J 15/025* (2013.01); B01D 2046/2433 (2013.01); B01D 2046/2437 (2013.01); B01J 23/72 (2013.01); B01J 27/138 (2013.01); C04B 2111/00793 (2013.01); C04B 2235/383 (2013.01); C04B 2235/40 (2013.01); C04B 2235/401 (2013.01); C04B 2235/402 (2013.01); C04B 2235/407 (2013.01); C04B 2235/425 (2013.01); C04B 2235/428 (2013.01); C04B 2235/5436 (2013.01); C04B 2235/604 (2013.01); C04B 2235/6021 (2013.01); C04B 2235/6567 (2013.01); C04B 2235/6581 (2013.01); C04B 2235/6586 (2013.01); C04B 2235/661 (2013.01); C04B 2235/663 (2013.01); C04B 2235/767 (2013.01); C04B 2235/786 (2013.01); C04B 2235/80 (2013.01); C04B 2235/96 (2013.01); F01N 3/0222 (2013.01); F01N 3/035 (2013.01); F23C 13/08 (2013.01); F23J 2219/10 (2013.01)

(58) Field of Classification Search
CPC . C04B 41/85; C04B 41/4523; C04B 41/4556; C04B 41/5096; C04B 41/5155; C22C 1/1005; C22C 1/1036
See application file for complete search history.

(56) References Cited

U.S. PATENT DOCUMENTS

| | | | |
|---|---|---|---|
| 5,263,530 A | 11/1993 | Colvin | |
| 5,509,555 A * | 4/1996 | Chiang | ............... C04B 35/573 216/101 |
| 5,678,298 A | 10/1997 | Colvin | |
| 5,981,083 A | 11/1999 | Colvin | |
| 6,447,852 B1 * | 9/2002 | Gordeev | ............... C04B 35/52 264/328.1 |
| 6,503,572 B1 * | 1/2003 | Waggoner | ............ C04B 35/565 427/228 |
| 7,658,781 B1 | 2/2010 | Waggoner et al. | |
| 7,985,274 B2 | 7/2011 | Barataud-Dien et al. | |
| 2007/0032370 A1 | 2/2007 | Weisensel et al. | |
| 2014/0311111 A1 * | 10/2014 | Wolff | ................... B01J 27/224 55/523 |

FOREIGN PATENT DOCUMENTS

| | | |
|---|---|---|
| EP | 1741685 | 1/2007 |
| IN | 253303 | 9/2009 |
| JP | 2004189576 | 7/2004 |
| JP | 2010105861 | 5/2010 |
| WO | 93/02232 | 2/1993 |
| WO | 2010/112778 | 10/2010 |
| WO | 2011/027083 | 3/2011 |
| WO | 2013/076045 | 5/2013 |

OTHER PUBLICATIONS

Hvam et al, "The effect of trace amounts of copper on the microstructure, stability and oxidation of macroporous silicon carbide", Journal of the European Ceramic Society, Elsevier Science Publishers, Barking, Essex, GB, vol. 36, No. 14, Mar. 11, 2016, pp. 3279-3284.

* cited by examiner

METHOD OF PRODUCING A BODY COMPRISING POROUS ALPHA SILICON CARBIDE AND THE BODY PRODUCED BY THE METHOD

FIELD OF THE INVENTION

The present invention relates to a method of producing porous alpha-SiC containing shaped body and porous alpha-sic containing shaped body produced by that method.

BACKGROUND OF THE INVENTION

SiC-based materials are employed from a multiplicity of different applications, especially where high stability at high temperature or high corrosion resistances are required. Highly porous, light weight SiC-based ceramics are used to an increasing extent as supports for catalysts and as filter materials for the purification of waste gases at high temperature.

In particular, filters are used for examples in order to reduce the proportion of soot in the exhaust gas of a diesel engine.

Filters can be also coated with catalyst in order both to support the combustion of the soot and the oxidation of residual hydrocarbons and carbon monoxide and selective catalytic reduction (SCR) for NOx reduction.

Filters may take the form of wall-flow monoliths.

Ceramic wall-flow monoliths are the most common type of diesel filter substrate. They are distinguished, among other diesel filter designs, by high surface area per unit volume and by high filtration efficiencies. Monolithic diesel filters consist of many small parallel channels forcing the diesel aerosol through the porous substrate walls that act as a mechanical filter. To reflect this flow pattern, the substrates are referred to as the wall-flow monoliths.

Wall-flow filter walls have a distribution of fine pores that have to be carefully controlled in the manufacturing process. Total material accessible porosity is typically between 45 and 50% or higher. Filtration mechanism on monolith wall-flow filters is a combination of cake and depth filtration. Typically, monolith filters have filtration efficiencies between about 70 and 95% of total particulate matter (TPM).

Wall-flow monoliths are typically made up of porous ceramic materials. Two materials most commonly used in commercial filters include cordierite and silicon carbide (SiC).

Commercial high porosity filters, such as with accessible porosity higher than 55% are in general highly brittle and thus very fragile.

Current production methods for SiC filters are also highly energy consuming as these operate at high temperature and require several steps rendering production cost very high.

Hence, a high porosity silicon carbide filter with enhanced mechanical stability would also be advantageous.

Furthermore, an improved method of producing a high porosity silicon carbide filter which is less energy consuming, reduces the amounts of steps needed and thus reduces its cost would be advantageous.

OBJECT OF THE INVENTION

It is an object of the present invention to provide a method of producing a high porosity silicon carbide product which is less expensive, reduces the amounts of steps needed and reduces the cost when compared to conventional methods of producing porous silicon carbide product.

It may be seen also as an object of the present invention to provide a high porosity silicon carbide product with high mechanically stability, by producing a high porosity silicon carbide product that has a minimal amount of undesirable by-product crystals, large amount of anhedral crystals with high level of interconnections between the crystals and a narrow pore and crystal size distribution and with a thick stabilizing silicon oxide layer grown in situ.

SUMMARY OF THE INVENTION

Thus, the above described object and several other objects are intended to be obtained in an aspect of the invention by providing a method of producing a porous silicon carbide product, the method comprising: preparing a mixture comprising silicon, carbon, at least one silicide forming and carbide forming agent and at least one alloy forming agent; producing a monolith structure by processing the mixture; applying heating to the monolithic structure.

The method of the invention combines at least one silicide forming and carbide forming agent and at least one alloy forming agent in the mixture for producing the porous silicon carbide product.

This combination is essential so as to achieve a porous silicon carbide product having the desired crystal structure and the desired proprieties.

The silicide forming and carbide forming agent has the function of promoting the siliconization by forming an alloy with the silicon and thus lowering the temperature needed for siliconization.

However, the use of a silicide forming and carbide forming agent has the drawback of promoting abnormal crystal growth and formation of large ternary carbide crystals that render the structure very brittle and may disturb any wash coating process.

The inventors facing this problem devised the invention by adding to the mixture comprising silicon and carbon and one silicide forming agent at least one alloy forming agent.

The presence of the alloy forming agent avoids the abnormal crystal growth and reduces the formation of ternary carbides. The alloy forming agent alloys with the silicide forming and carbide forming agent and keeps the silicide forming and carbide forming agent in a liquid form in turn avoiding the formation of large crystals, especially ternary carbides.

The alloy forming agent may thus have the function of alloying with the silicide forming and carbide forming agent preventing its evaporation at high temperature.

The at least one alloy forming agent may be an agent supporting oxidation of silicon carbide, for example supporting surface oxidation of silicon carbide.

The agent supporting oxidation of silicon carbide may have the function of promoting limited oxidation of the silicon carbide surface and thus promoting the formation of a silicon oxide protection layer onto the silicon carbide surface. The silicon oxide protection layer may have an optimal thickness in the range between 50 and 100 nm.

The at least one alloy forming agent may be an alloy forming agent supporting oxidation of silicon carbide.

Thus, in combination with the first function of alloying with the silicide forming and carbide forming agent the alloy forming agent may have the second function of promoting limited oxidation of the silicon carbide surface and therefore promoting the formation of a silicon oxide protection layer onto the silicon carbide surface.

The final silicon carbide product is characterized by a layer of silica on to the alpha SiC structure and by a characteristic microstructure which provides an enhanced mechanical stability.

The combination of at least one silicide forming and carbide forming agent and at least one alloy forming agent is thus necessary to achieve the desired structure of the invention characterized by the absence of large crystals, by the presence of a high percentage of anhedral crystal and by the presence of a layer of silica having an optimal thickness.

The combination of at least one silicide forming and carbide forming agent and at least one alloy forming agent provides a characteristic microstructure that is characterized by:

Narrow grain size distribution;
Absence of abnormal grain growth;
Presence of a high percentage of anhedral crystal shapes;
High level of interconnection between the crystals;
Presence of a thick silica layer;
High mechanical stability;
Absence of large by-product crystals.

The at least one silicide forming and carbide forming agent may comprise a metal element.

The at least one alloy forming agent may comprise a metal element.

Thus, the mixture may comprise a first metal and a second metal, i.e. may be a bi-metallic mixture.

The first metal may have the function of keeping the temperature of siliconization lower, thus may have the function of reducing the temperature of siliconization.

The second metal may have the function of avoiding the evaporation of the first metal and promoting the formation of silica on the outer surface of the silicon carbide product.

The mixture may also comprise other compounds, such as polymers.

The mixture may also comprise agents promoting the formation of pores, e.g. pore formers that may be polymer based.

The mixture comprising silicon, carbon, at least one silicide forming and carbide forming agent and at least one alloy forming agent may also be referred to as initial mixture or starting mixture.

In some embodiments, the processing of the mixture producing the monolith structure is by extrusion or by application of pressure to the mixture.

The mixture may be extruded into a monolithic structure or monolith.

In some further embodiments, the applying heating comprises performing pyrolysis of the produced monolithic structure in a controlled atmosphere at a temperature between 700 and 1000° C. for a period between 1 and 24 h.

Pyrolysis is a thermochemical decomposition of organic material at elevated temperatures normally performed in the absence of oxygen or air. It involves the simultaneous change of chemical composition and physical phase, and is irreversible. In the method of the invention, pyrolysis is performed in controlled atmosphere. Controlled atmosphere may be an inert atmosphere.

Inert atmosphere refers to a gaseous mixture that contains little or no oxygen and primarily consists of non-reactive gases or gases that have a high threshold before they react.

For example, inert atmosphere may comprise nitrogen, argon, or helium gas. Controlled atmosphere may be also not an inert atmosphere.

For example, controlled atmosphere may comprise nitrogen gas that may be reactive at elevated temperature.

Following the temperature treatment of the pyrolysis at least three further temperature treatments are applied.

Thus, in some embodiments, the step of applying heating further comprises:

applying to the produced monolithic structure at least three temperature treatments wherein the temperature is varied between room temperature and 2100° C.

Room temperature is defined to be about 20 to 26° Celsius with an average of 23° C.

The temperature treatment may be a sharp step or a gradient of temperature, such as a smooth gradient of temperature, thus a graded change in the temperature applied to the monolithic structure. Temperature treatment may be also referred to as temperature gradient.

In some embodiments, the at least three temperature treatments comprise: a first temperature treatment between 850 and 1500° C. for a period between 1 and 24 h in inert atmosphere or vacuum; a second temperature treatment between 1500° C., up to 2100° C. and back to room temperature for a period between 1 and 24 h in a controlled atmosphere; a third temperature treatment between room temperature, up to 1150° C. and back to room temperature in an oxidizing atmosphere.

The first temperature treatment may occur in inert atmosphere, such as in Argon gas, or in vacuum.

The second temperature treatment may occur in a controlled atmosphere, such as in Argon gas.

The third temperature treatment may occur in an oxidizing atmosphere, thus in conditions that would provide oxidation of the SiC surface produced to build up a protective silica layer. For example, it may occur in presence of an oxidizing agent, such as oxygen gas, or gas containing oxygen, such as air.

The third temperature treatment may be referred to also as oxidation step.

It can be noticed that the presence of at least one alloy forming agent causes a significantly higher increase in weight after the third temperature treatment, or oxidation step than when the at least one alloy forming agent is not present.

In some embodiments, the method according to the first aspect of the invention further comprises exposing the heat treated porous silicon carbide product to acidic environment.

Exposure to acidic environment may be achieved by, for example, treating the heat treated porous silicon carbide product with an acid or acidic media.

Acidic media suitable for this treatment may be mineral, organic or inorganic acid. Acidic media may also include additional oxidizing agents that can dissolve compounds or alloys that include the metal elemental comprised in the alloy forming agent.

Examples of these acidic media are $HNO_3$, HCl or citric acid.

Treating the heat treated porous silicon carbide product following the at least three temperature steps may occur at different temperatures, e.g. between 50 and 100° C., and for several hours, for example between 1 and 5 hours.

The treatment with acidic media has the effect of removing, at least partially undesired oxides so as to avoid production of unwanted byproducts during the use of the porous silicon carbide product or to comply with national regulation.

In some embodiments the method according to the first aspect of the invention further comprises depositing a catalyst onto the temperature treated monolithic structure.

The method according to some embodiments of the invention may produce a porous silicon carbide product that have the function of being a support for a catalyst. By depositing the catalyst onto the temperature treated monolithic structure a support for a catalyst is advantageously produced.

In some embodiments, the at least one silicide forming and carbide forming agent comprises a metal element, such as Al.

The at least one silicide forming and carbide forming agent may comprise a metal element, for example an element of group 12, 13 or 2, according to the new IUPAC denomination, such as Zn, Al or Mg.

The presence of at least one of these elements in the silicide forming and carbide forming agent allows for reduction of the siliconization temperature.

In some embodiments the at least one silicide forming and carbide forming agent comprises a group 12 element, such as Zn.

In some embodiments, the at least one silicide forming and carbide forming agent comprises a group 2 element, such as Mg.

In some embodiments, the at least one silicide forming and carbide forming agent may comprise two or more elements selected from the group 12, 13 or 2.

In some embodiments the at least one alloy forming agent comprises a metal element.

In some embodiments the at least one alloy forming agent comprises a group 11 element, such as Cu.

The at least one alloy forming agent may comprise Sn element, i.e. Tin.

In some embodiments, the at least one alloy forming agent may comprise two or more elements selected from the group 2, 11, or 14.

When two or more elements from the group 2, 11, or 14 are present, the function of alloying with the at least one silicide forming and carbide forming agent and the function of promoting the oxidation of silicon carbide so as to build up a silica protection layer onto the SIC surface may be performed separately by two or more different elements.

In some embodiments, the at least one alloy forming agent is, after performing the pyrolysis, present in a concentration between 0.1 and 0.9 at %, such as 0.5 at. %.

It has been found that a concentration of the at least one alloy forming agent between 0.1 and 0.9 at % (atomic percent), such as 0.5 at % is preferred for the formation of the silicon carbide product with the desired structure and properties.

An amount of the alloy forming agent higher than the percentage of that range may lead to the production of a silicon carbide product having less mechanical stability.

An amount of the alloy forming agent lower than the percentage of that range may lead to the production of a silicon carbide product having abnormal crystal growth and high content of ternary carbides.

The desired concentration of the at least one alloy forming agent, such as Cu, between 0.1 and 0.9 at % is an optimal concentration range. Within this optimal concentration range the desired porous silicon carbide product structure can be obtained.

In a second aspect the invention relates to a porous silicon carbide product having a monolithic structure, the porous silicon carbide product comprising anhedral crystals in a concentration higher than 60%.

A porous silicon carbide product is a body or an article comprising silicon carbide.

The product produced by the method according to the first aspect of the invention contains mostly anhedral crystals, while euhedral crystal are absent or present in minor amount.

For example, the porous silicon carbide product may comprise euhedral crystals in a concentration lower than 40%.

The method according to the first aspect of the invention leads to the production of a porous silicon carbide product having a structure where the content of euhedral crystals is lower than in other silicon carbide products.

In particular, the addition of at least one alloy forming agent to the starting mixture generates a product having a content of euhedral crystals that is lower than in a product produced without at least one alloy forming agent.

This higher content of anhedral crystals and lower content of euhedral crystals in the monolith may improve the mechanical stability of the silicon carbide product.

In some embodiments, the porous silicon carbide product comprises Al containing ternary carbide crystals having a grain size lower than 150 µm, such as lower than 100 µm, such as between 80 and 20 µm.

In some embodiments, the porous silicon carbide product has a crystal grain size that is less than 30 µm, such as between 20 and 2 µm.

In some embodiments, at least 50% of the crystals have a grain size that is less than 30 µm, such as between 20 and 2 µm.

In some further embodiments, the grain size of interconnected SiC crystals is less than 30 µm, such as between 20 and 2 µm.

In some embodiments, at least 50% of the interconnected crystals have a grain size that is less than 30 µm, such as between 20 and 2 µm.

The method according to the first aspect of the invention leads to the production of a porous silicon carbide product having an amount of interconnected crystals larger than other silicon carbide products.

In particular, the addition of at least one alloy forming agent to the starting mixture generates a product having an amount of interconnected crystals larger than the amount in a product produced without at least one alloy forming agent.

Interconnected crystals are crystals characterized by the presence of bridges between the silicon carbide grains that are formed in situ during the thermal treatments according to the method of the first aspect of the invention.

Interconnected crystals produce pores with high pore connectivity, thus resulting in high permeability as well as high mechanical strength.

In some embodiments, the porous silicon carbide product has a high mechanical stability.

In general, the mechanical stability of the porous silicon carbide product according to the invention is higher than for the same product produced without including an alloy forming agent in the initial mixture.

High mechanical stability is defined as a wall strength higher than 3 MPa, determined according to ASTM 1674-08.

The presence of at least one alloy forming agent in the starting mixture leads to a significant increase in mechanical strength when the accessible porosity is higher than 65% following the oxidation step.

This may be due to the fact of the presence of a thick silica layer formed during the oxidation step induced by the presence of the at least one alloy forming agent in the starting mixture.

In some embodiments, the porous silicon carbide product has an accessible porosity between 50% and 70%.

The method according to the first aspect of the invention leads to the production of a porous silicon carbide product having an accessible porosity lower than other silicon carbide product.

In particular, the addition of at least one alloy forming agent to the starting mixture generates a product having an accessible porosity lower than a product produced without at least one alloy forming agent.

Accessible porosity is defined as an open porosity thus a porosity that can be accessed. In general, porosity can be subdivided into accessible and inaccessible porosity.

Inaccessible porosity occurs in disconnected pores and pore clusters. Accessible porosity occurs in interconnected pores or pore cluster and can be for example subdivided into edge-only accessible or backbone porosity.

The accessible porosity provides an indication on the contact surface area available to a fluid flowing across the porous silicon carbide product accessible porosity is a necessity for wall-flow filters in order to filtrate soot and high accessible porosity necessary to minimise backpressure on the engine side of the filter which can disrupt combustion. Also high accessible porosity is favourable when applying a catalyst to the monolith since adding a catalyst reduces the accessible porosity and pore size in general.

In some embodiments, the porosity may be between 50% and 70%, such as 58% and 65%.

In some embodiments, the porous silicon carbide product comprises pores having a size in the range between 10 and 25 μm.

In some embodiments, the porous silicon carbide product comprises pores having a size in the range between 15 and 25 μm.

In some embodiments, at least 50% of the pores have a size in the range between 10 and 25 μm.

In some embodiments, at least 50% of the pores have a size in the range between 15 and 25 μm.

The method according to the first aspect of the invention leads to the production of a porous silicon carbide product having pores with an average size that is smaller than other silicon carbide product.

In particular, the addition of at least one alloy forming agent to the starting mixture generates a product having pores with an average size that is smaller than the ones of a product produced without at least one alloy forming agent.

This specific pores size combined with the accessible porosity and grain size provides a characteristic structure having the desired mechanical stability.

The formation of the silica layer, induced by the presence of the at least one agent supporting oxidation of silicon carbide or at least one alloy forming agent supporting oxidation of silicon carbide, narrows the distribution of the pore size when compared to a product where the at least one alloy forming agent was not added to the starting mixture.

In some embodiments, the porous silicon carbide product comprises at least one metal element of group 2 element, group 12 element or group 11 element or a combination thereof in traces.

Metal elements employed in the production of the silicon carbide product may be contained in traces in the product.

For example, when compounds comprising a metal element are used as alloy forming agent, the same metal element may be present in traces in the product. This may be an advantage when the product requires the presence of the same metal as catalyst, or component in catalyst, e.g. Cu.

In traces may be defined as in the concentration between 10 and 1000 ppm, such as in the concentration of 100 ppm (100 μg/g).

In some embodiments, the porous silicon carbide product comprises at least one metal element of group 2 element, group 12 element or group 11 element or a combination thereof in concentration higher than 1000 ppm, such as between 100 and 1 mg/g.

In some embodiments, the porous silicon carbide product comprises a silicon oxide layer having a thickness between 50 and 100 nm.

A thick oxide layer is produced by the method according to the first aspect of the invention due to the presence of an agent supporting oxidation of silicon carbide.

The presence of a silicon oxide layer having a thickness between 50 and 100 nm has the advantage of improving the mechanical strength of the porous silicon carbide product and act as a suitable surface for the attachment of an applied catalyst.

In some embodiments, the porous silicon carbide product is a filter.

For example, the porous silicon carbide product may be a diesel particle filter (DPF).

In a third aspect, the invention relates to the use of a porous silicon carbide product as a DPF.

Thus, in one embodiment the invention relates to a DPF comprising the porous silicon carbide product according to the second aspect of the invention.

In a fourth aspect, the invention relates to the use of a porous silicon carbide product for filtering flue gas originated from the combustion of diesel fuel.

The porous silicon carbide product may be located in the exhaust of a vehicle for filtering exhaust originated in diesel combustion engine.

In another aspect, the invention relates to the use of a porous silicon carbide product as a support for a catalyst.

In a further aspect the invention relates to the use of a porous silicon carbide product as a filter and as a support for a catalyst.

The filter may be located in the exhaust of a vehicle for filtering exhaust originated in diesel combustion engine.

The first, second and other aspects and embodiments of the present invention may each be combined with any of the other aspects and embodiments. These and other aspects and embodiments of the invention will be apparent from and elucidated with reference to the embodiments described hereinafter.

BRIEF DESCRIPTION OF THE FIGURES

The silicon carbide filters and the method according to some aspects of the invention will now be described in more detail with regard to the accompanying figures. The figures show one way of implementing the present invention and is not to be construed as being limiting to other possible embodiments falling within the scope of the attached claim set.

FIG. 8A, the differential increase after each step, i.e. FIG. 8B, and the first two oxidation steps accumulated in comparison to FIG. 8B, i.e. FIG. 8C, respectively.

DETAILED DESCRIPTION OF EMBODIMENTS

Example 1

Figure 1:
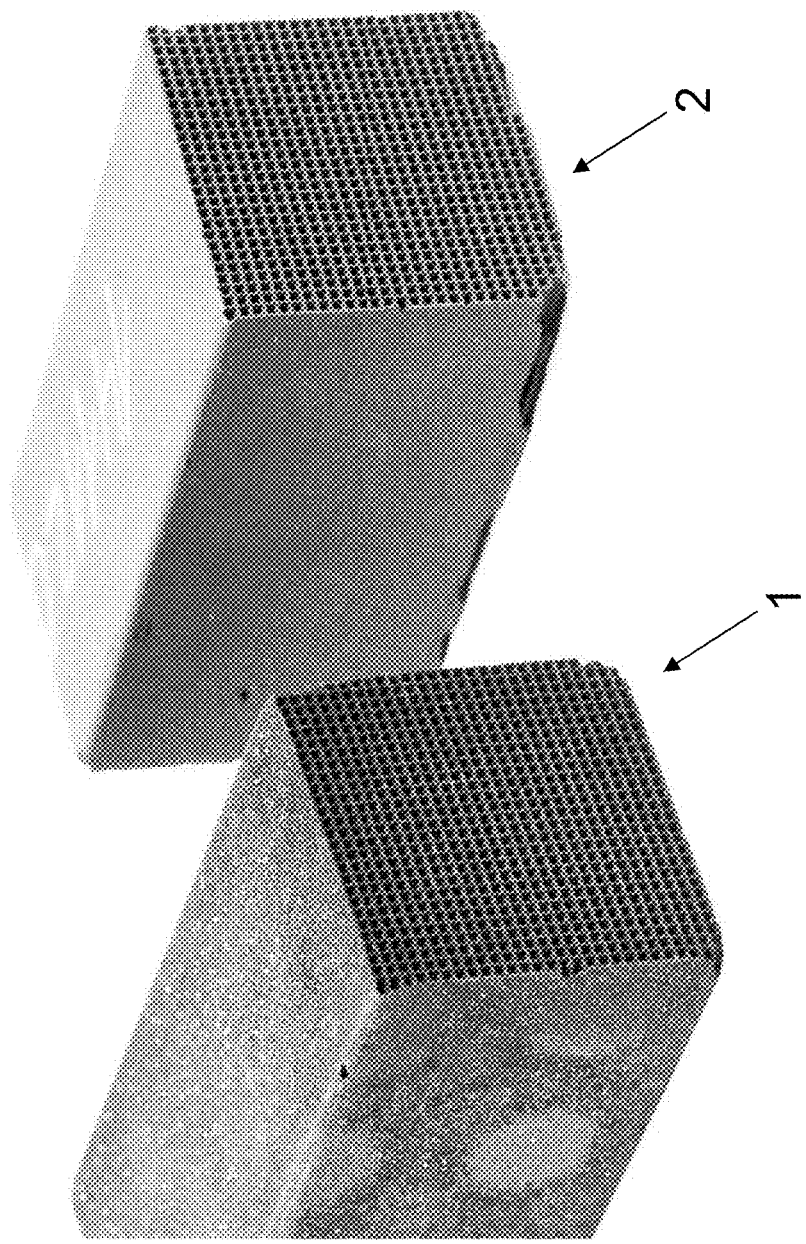
FIG. 1 shows the visual comparison between a DPF after the oxidation step when the starting mixture does not comprise an alloy forming agent (1) and when the mixture comprises Cu (2).

An extrusion batch starting mixture was created according to the following formulation:

| Material | Weight % |
|---|---|
| Electrode graphite 0-40 µm | 17% |
| Liquid starch | 8.35% |
| Metallic Silicon 20-75 µm | 44% |
| Aluminium flakes | 4.8% |
| Metallic copper 0-50 µm | 1.15% |
| Methyl cellelose ether | 3.8% |
| Water | 20.4% |
| Polyoxyethylene | 0.5% |

The electrode graphite was a commercially available Elektrodengrafit from Richard Anton; the liquid starch is the product CS76 from Zschimmer & Schartz; the metallic silicon was the Silgrain HQ from Elkem in a size of 20-75 µm; the aluminum flakes are the Exoandit BE1160 from Grimm Metallpulver; the copper powder was also from Grimm Metallpulver and has the commercial name Rogal Kupfer 50 and the Methyl Cellulose ether was the Methocel K15M from Dow. The Polyoxyethylene was also from Zschimmer & Schwartz and has the commercial name Zusoplast G72.

First, the dry components were mixed and then the wet components added. The whole mixture was ready after a mixing time of 3 hours in a Z-blade mixer. This starting mixture was filled into a piston extruder and extruded at a pressure of 70 bar into a honeycomb shape with a cell density of 200 cpsi and a wall thickness of 16 mil/400 µm. They were cut to a length of 220 mm.

These honeycomb monoliths were dried in continuous airflow of 0.9 m/s for 5 hours.

After drying the monoliths went through a step-heat-treatment comprising a pyrolysis and three further heating steps (I-II-III) as described below and illustrated graphically in FIG. 2.

The Pyrolysis occurs under 16.5 L/min flowing nitrogen gas ($N_2$) of 99.8% purity at 850° for 1 h in a 240L tube furnace;

In the subsequest reaction step the monoliths were placed in a graphite crucible in high temperature furnace (maximum; 2500° C.) of 70L; in the reaction step at 1450° C. for 2 h, and subsequently at 1600° C. for another 1 h under argon (Ar) (99%) with a flow rate of 4L/min, Si and C react to form 3C-SiC.

Before the recrystallization step the atmosphere is renewed without cooling. In the recrystallization step the monoliths were heated from the 1600° C. to 1960° C. and held there for 2 h and the 3C-SiC is converted to alpha-SiC and opening of the pores in the microstructure takes place through recrystallization. The monoliths are subsequently cooled, still under argon, by turning off the furnace Following the recrystallization step, oxidation of the monoliths in air to 1100° C. for 4 h in an electrical furnace during the oxidation step. Cooling was achieved by turning off the furnace.

Monoliths were taken out for characterization before and after this last oxidation step.

The samples were characterized with X-Ray Diffractrometry (XRD), Scanning Electron Microscope (SEM), argon ion sputtering combined with Auger Electron Spectroscopy (AES), Energy Dispersive Spectroscopy (EDS) and Mercury Intrusion Porosimetry (MIP). In addition, the mechanical strength was tested on test bars with 7×7 cells and a length of 120 mm according to ASTM 1674-08.

Furthermore, honeycomb monoliths were taken and cut to 203 mm length. The channels on each side were closed alternatively on each side with a cement based on the composition of 64.5 weight-% SiC, 1 weight-% Methyl cellulose ether, 23.5 weight-% silica sol with 45% solid content and 11 weight-% of water in a way that each open inlet channel is closed on the outlet and vice versa.

These 49 mm×49 mm and 203 mm long filter segments were tested in respect to back pressure at volume flow rates of 1000 L/min at 23° C. (cold flow test).

Example 2

An extrusion batch starting mixture was created according to the following formulation:

| Material | Weight % |
| --- | --- |
| Electrode graphite 0-40 μm | 15.5% |
| Liquid starch | 7.25% |
| Metallic Silicon 20-75 μm | 40.2% |
| Aluminum flakes | 4.4% |
| Metallic copper 0-50 μm | 1.05% |
| Methyl cellulose ether | 5.6% |
| Water | 19.3% |
| Polyamide powder | 3.0% |
| Polypropylene powder | 3.2% |
| Polyoxyethylene | 0.5% |

The mixing sequence was the same as for example 1. However, in example 2 the polymer powders polyamide and polypropylene have been added to the dry components as pore forming agents.

The polyamide powder was the commercial product Vestamelt 730 P1 from Evonik; the polypropylene powder is the commercial available PropyolTex 270S with a mean particle diameter of 15-25 μm from Micro Powders Inc.

The same type of plugged filter segments have been prepared to check the back pressure and also the same type of 7×7 channels test bars for the flexural strength according to ASTM 1674-08.

Comparative Examples 1b and 2b

In addition to the examples 1 and 2 comparative examples 1b and 2b were conducted. The honeycomb monoliths were prepared exactly according to the formulation given in the two examples, 1 and 2, except for the fact that in both cases the copper was left out.

Evaluation of the Examples 1, 1b, 2 and 2b

By comparing the monoliths, with trace amounts of alloy forming agent (examples 1 and 2) and without (examples 1b and 2b), a clear difference in crystalmorphology, microstructure, mechanical stability, crystal by-product formation and the creation of in situ silica layer can be noticed.

Figure 2:
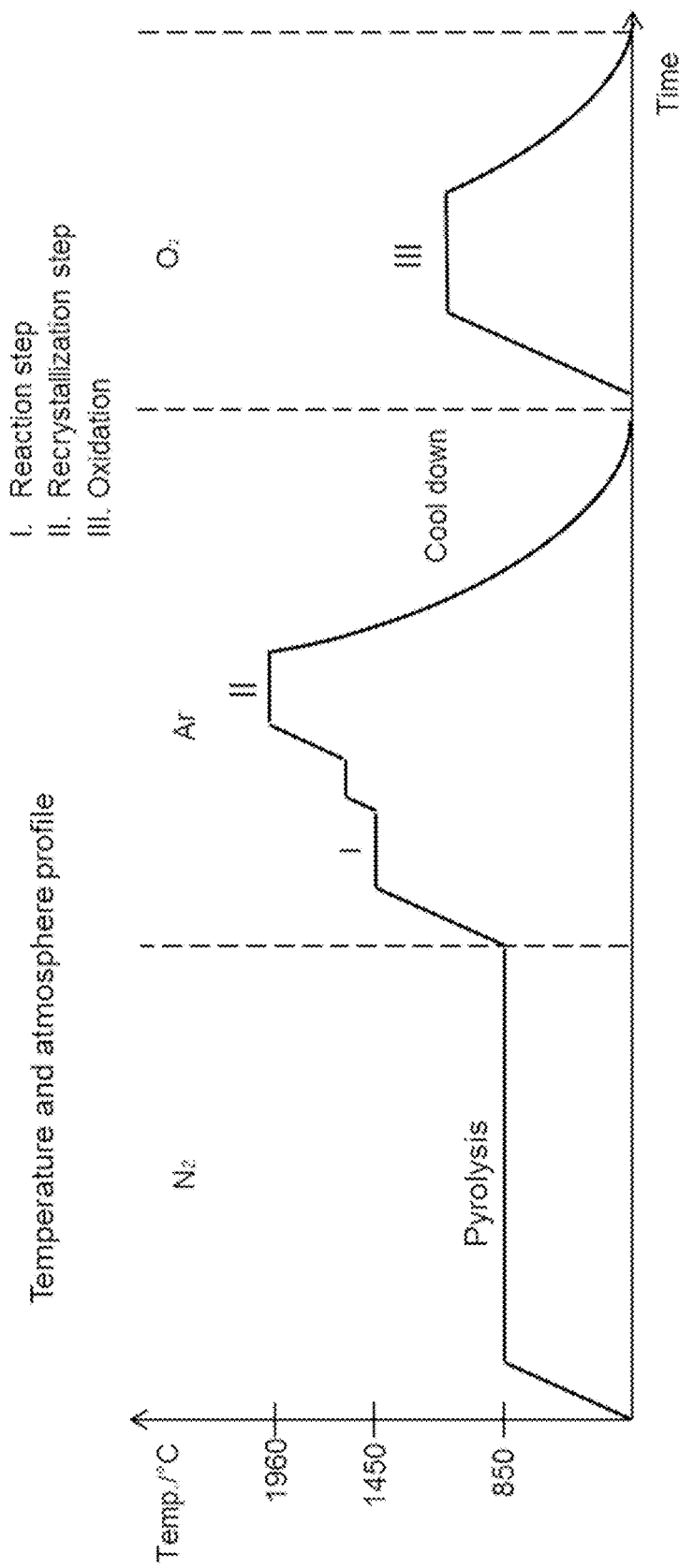
FIG. 2 is a graph showing the temperature and atmosphere profile for the process for producing porous alpha silicon carbide filters. For example, SIC filters with 58% accessible porosity with an average pore size of 18 μm. The line reflects the different steps.

The monoliths produced through the method described in examples 1 and 2 and represented in FIG. 2, according to one aspect of the invention, has some clear distinguishing features due to the presence of an alloy forming agent, such as Cu, in trace amounts, such as 0.5 at % (after pyrolysis 1 wt % before) in the starting mixture.

FIG. 1 shows the visual comparison between a DPF-monoliths after the oxidation step when the starting mixture does not comprise an alloy forming agent (referred as 1) and when the mixture comprises Cu (referred as 2), (examples 1 and 2).

Between the oxidized monoliths produced without Cu, FIG. 1-1, and the one produced with trace amounts of Cu, FIG. 1-2, there is a visible difference. The monolith produced from a starting mixture that does not contain Cu is brittle, bluish-black in colour and sparkling whereas the monolith produced from a starting mixture that contains Cu is neither of these.

Figure 3A:
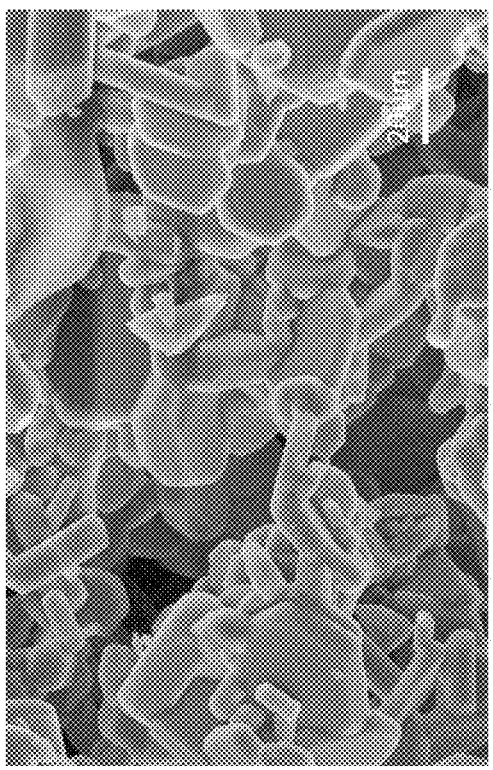
FIG. 3A-B are SEM images showing the microstructure of the monolith before oxidation, (FIG. 3A) when alloy forming agent is not present in the starting mixture and when Cu is present in trace amounts in the starting mixture (FIG. 3B). The microstructure is evidently different: both shapes and size of the crystals are different and the degree of interconnectedness is much more pronounced in the Cu containing monolith.
Figure 3B:
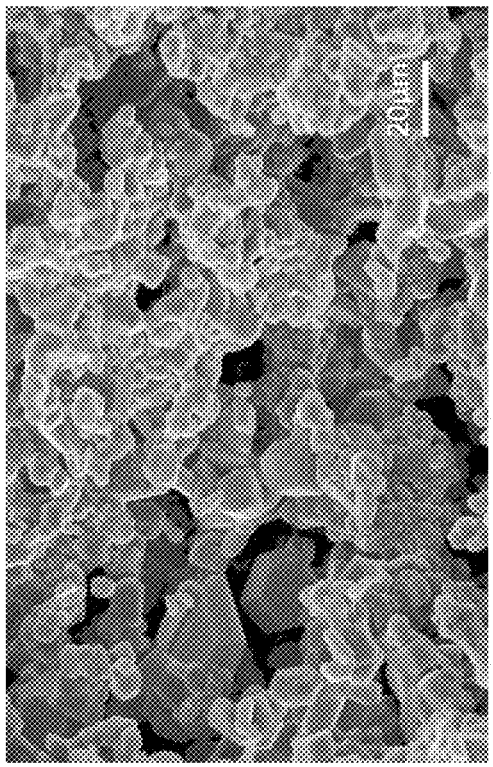

The heat treated monoliths clearly show individual anhedral interconnected 4H-SiC crystals, comparison of the unoxidized microstructure making up the monoliths without, FIG. 3A, and with Cu in trace amounts, FIG. 3B.

When an alloy forming agent is not present in the starting mixture (examples 1b and 2b) a by-product in the form of large ternary carbide crystals are intergrown with the SiC microstructure that can be identified by human eye as a sparking effect on the filter or monolith surface. This effect is not present when Cu is added to the starting mixture (examples 1 and 2). Thus, a significant difference introduced by the addition of Cu is the suppression or reduction of ternary carbide crystal formation.

Figure 5A:
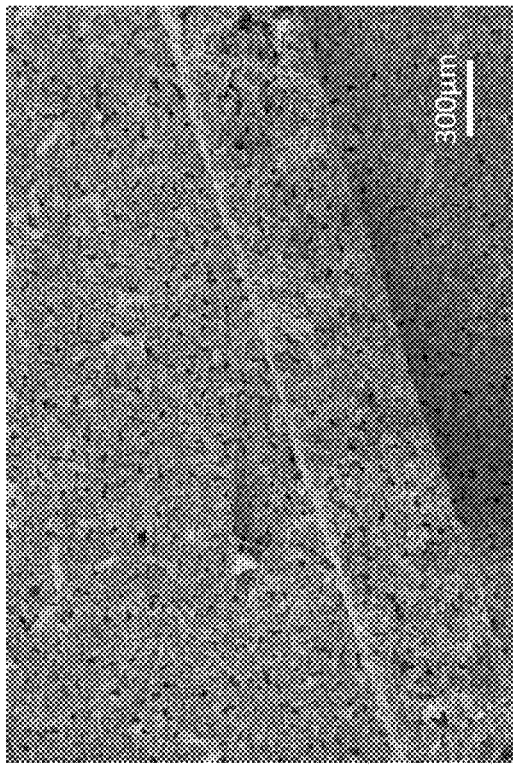
FIG. 5A-F show SEM images in different magnifications comparing the microstructure of the oxidized monoliths produced with trace amounts of Cu added to the starting mixture (FIGS. 5B, 5D and 5F) and without trace amounts of an alloy forming agent added to the starting mixture (FIGS. 5A, 5C and 5E). Clearly, the Cu reduces the ternary carbide formation and results in a more interconnected microstructure of smaller less euhedral crystals. After oxidation the surface of the crystals are covered by a thick silica layer.
Figure 5B:
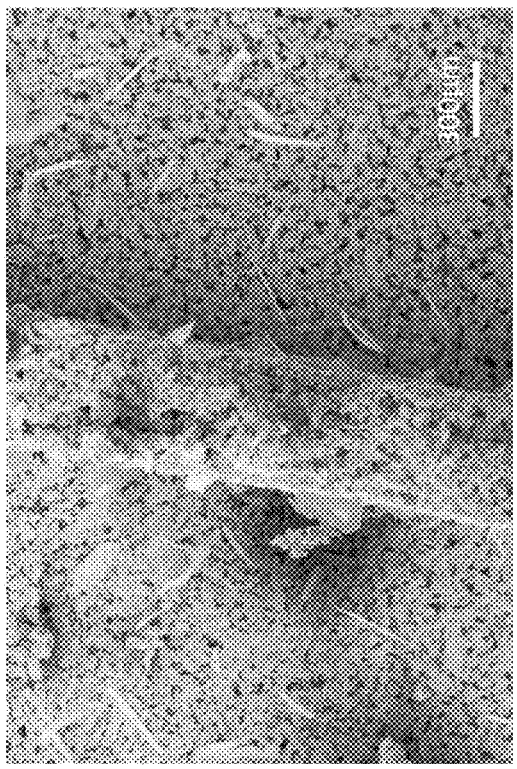

For monoliths produced without Cu (examples 1b and 2b) contain large aluminum containing ternary carbide crystals predominantly in the composition $Al_4SiC_4$ and $Al_4Si_2C_5$ (or the isostructural equivalent $Al_5NC_3$ and $Al_6N_2C_3$) and the solid solutions that can lie between these compositions. These crystals are translucent yellow in color and with a platy hexagonal shape. These yellow translucent crystals of a distinct hexagonal and platy shape may be deposited on the furnace walls and the surface of the monoliths upon condensation from vapour and may protrude the monolith surface. Generally, these crystals consist of a mixture of $Al_4SiC_4$ and $Al_4Si_2C_5$ and appear as intergrown with the 4H-SiC microstructure, FIG. 5A. When adding Cu in trace amounts to the starting mixture (examples 1 and 2) these by-product crystals are smaller and not disrupting the microstructure, FIG. 5B.

Figure 5D:
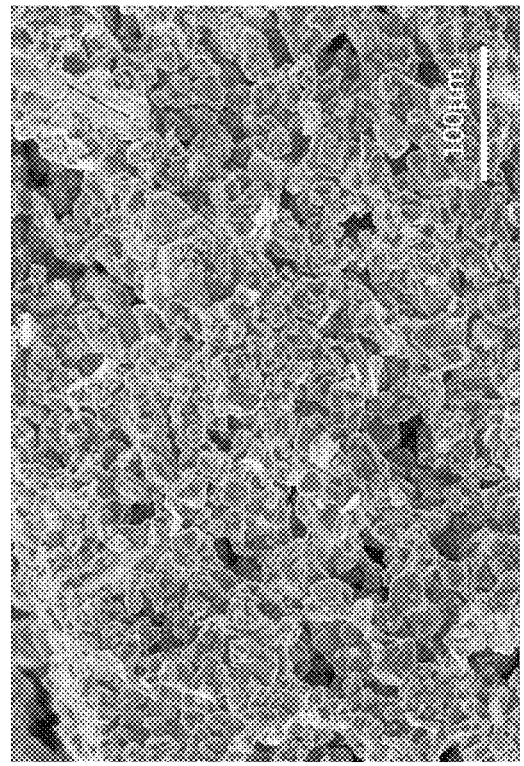
Figure 5C:
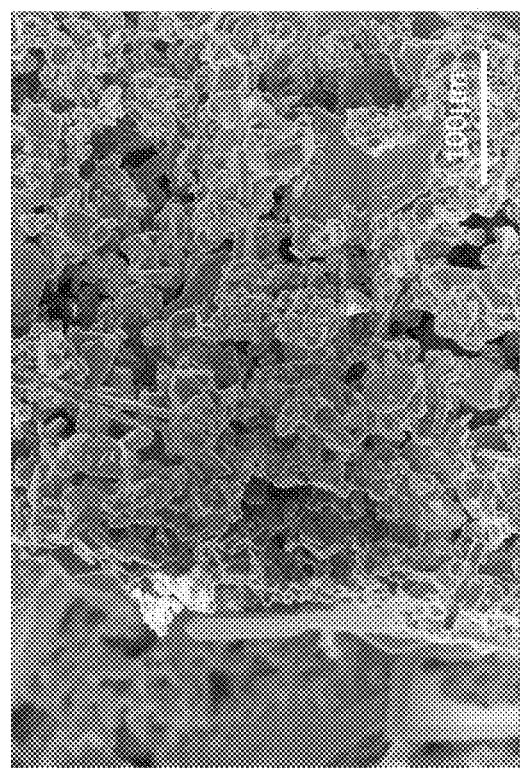

When adding trace amounts of Cu to the staring mixture (examples 1 and 2), the 4H-SiC microstructure has a narrow grain size distribution (GDS) of small grains characterized by normal grain growth, FIGS. 5C and 5D.

From this, it can also be observed that the grains size is smaller and less platy when adding trace amounts of Cu to the starting mixture. It appears that the viscosity of the Al—Si—Cu alloy increases with increasing Cu content. Higher viscosity in turn corresponds to a lower diffusivity in the Cu containing liquid. Since euhedral shapes are a function of the diffusivity, the low diffusivity when adding Cu to the Al—Si alloy will result in less euhedral crystal shapes as also observed. In addition the Al—Cu—Si alloy is more likely to be present in this viscous liquid phase since the addition of Cu to either Al or Si or a combination thereof lowers the melting point of the alloy, and the presence of Cu introduces an eutectic to the system.

Figure 4B:
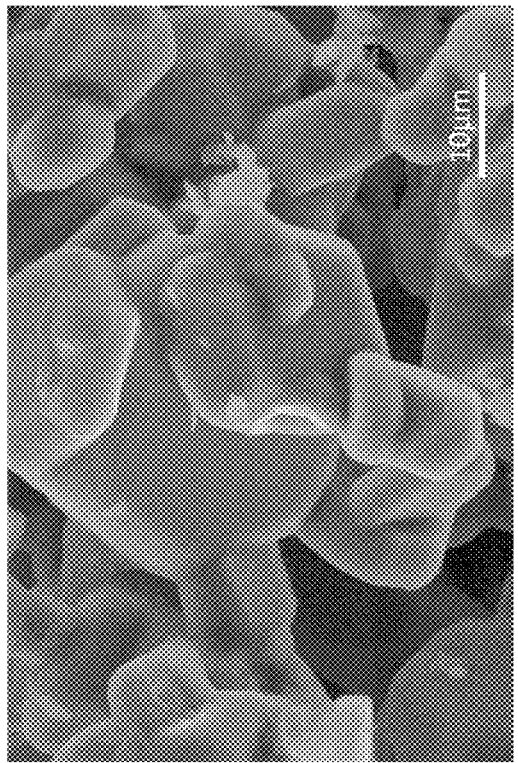
FIG. 4A-B are high magnification SEM images of the monolith containing trace amounts of Cu before (FIG. 4A) and after (FIG. 4B) oxidation. It can be noticed that after the oxidation step a thick surface layer is produced filling the minor cavities in the microstructure and thus increasing the overall mechanically stability of the filter.
Figure 4A:
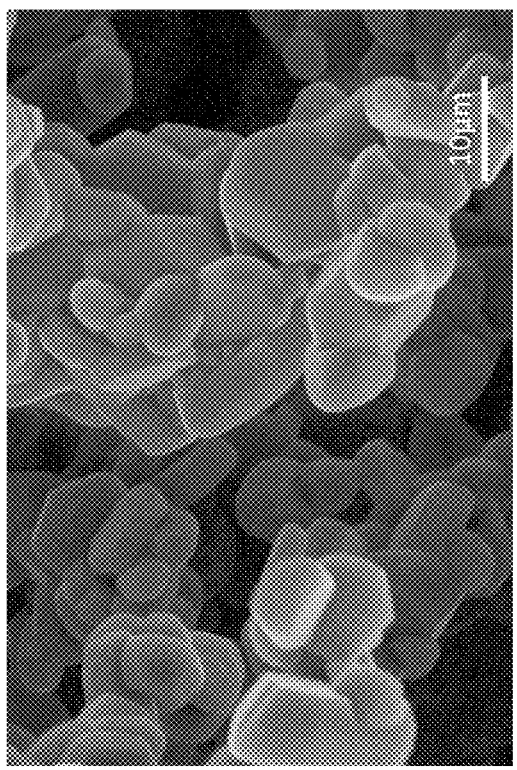
Figures 5E, 5F:
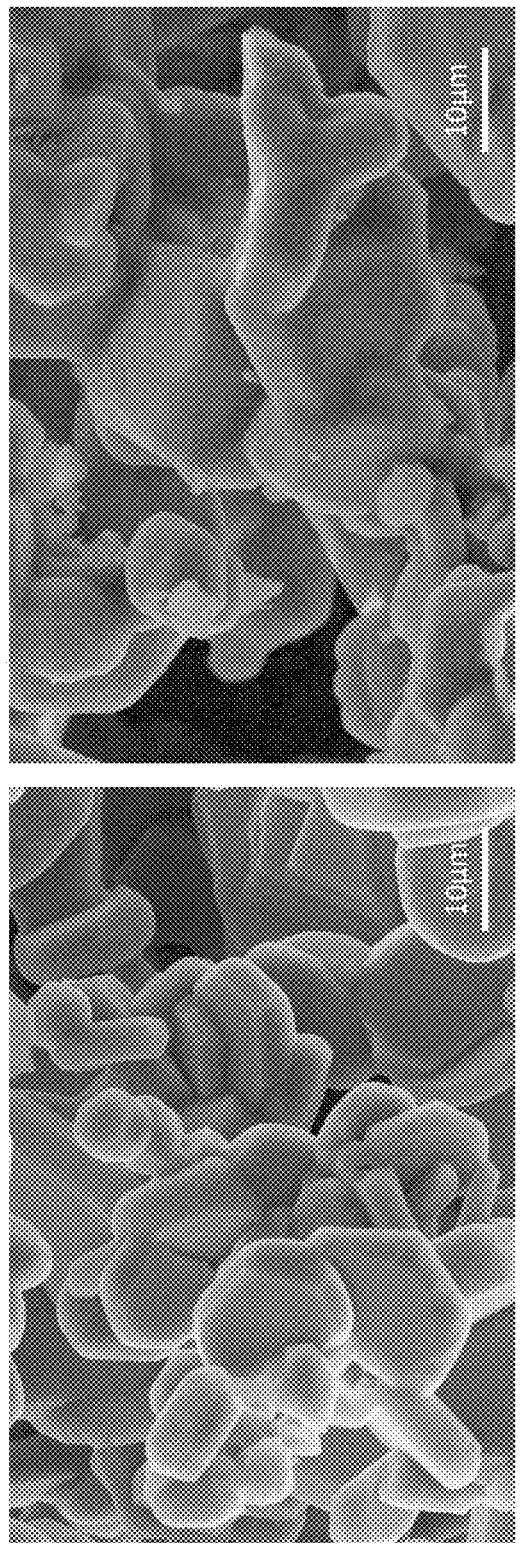

The above described effects contributes to a more mechanically stable microstructure and thus a more mechanically stable monolith, even before oxidation and this effect is even more pronounced after oxidation as shown in FIG. 4. As the monolith is oxidized in air a thick surface layer of silica is formed on the microstructure increasing the mechanical stability even further. The oxidized monoliths with (examples 1 and 2) and without trace amounts of Cu in the starting mixture (examples 1b and 2b) are shown in FIGS. 5F and 5E respectively. For the monolith with trace amounts of Cu in the starting mixture the silica layer fills the minor cavities in the microstructure stabilizing the overall structure and thus increasing mechanical stability.

The more rough surface morphology results from the silica formation which is an advantage when the addition of a catalyst is needed, as the catalyst adhesion to the surface is improved when the surface has a rough surface morphology.

The silica layer fills deep cavities providing a further advantage when the addition of a catalyst is needed. The filtered fluid does not get into direct contact with catalyst located in deep cavities in the microstructure, thus filling these with silica prevents catalyst from being deposited in these cavities and thus reducing the amount of catalyst needed to cover the microstructure.

The specific weight of the honey combs prepared according to the described examples are listed together with the back pressure at a flow rate of 1000 l/min in table 1.

TABLE 1

|  | weight before oxidation, g/L | weight after oxidation, g/L | weight increase, % | back pressure at 1000 L/min, mbar |
|---|---|---|---|---|
| Example 1 | 506 | 539 | 6.52% | 20 |
| Example 1b | 509 | 515 | 1.18% | 20.8 |
| Example 2 | 441 | 469 | 6.35% | 19.7 |
| Example 2b | 441 | 443 | 0.45% | 19.9 |

One can clearly notice that the weight increase is significantly higher for the examples 1 and 2 prepared by adding copper to the initial mixture.

Figure 6:
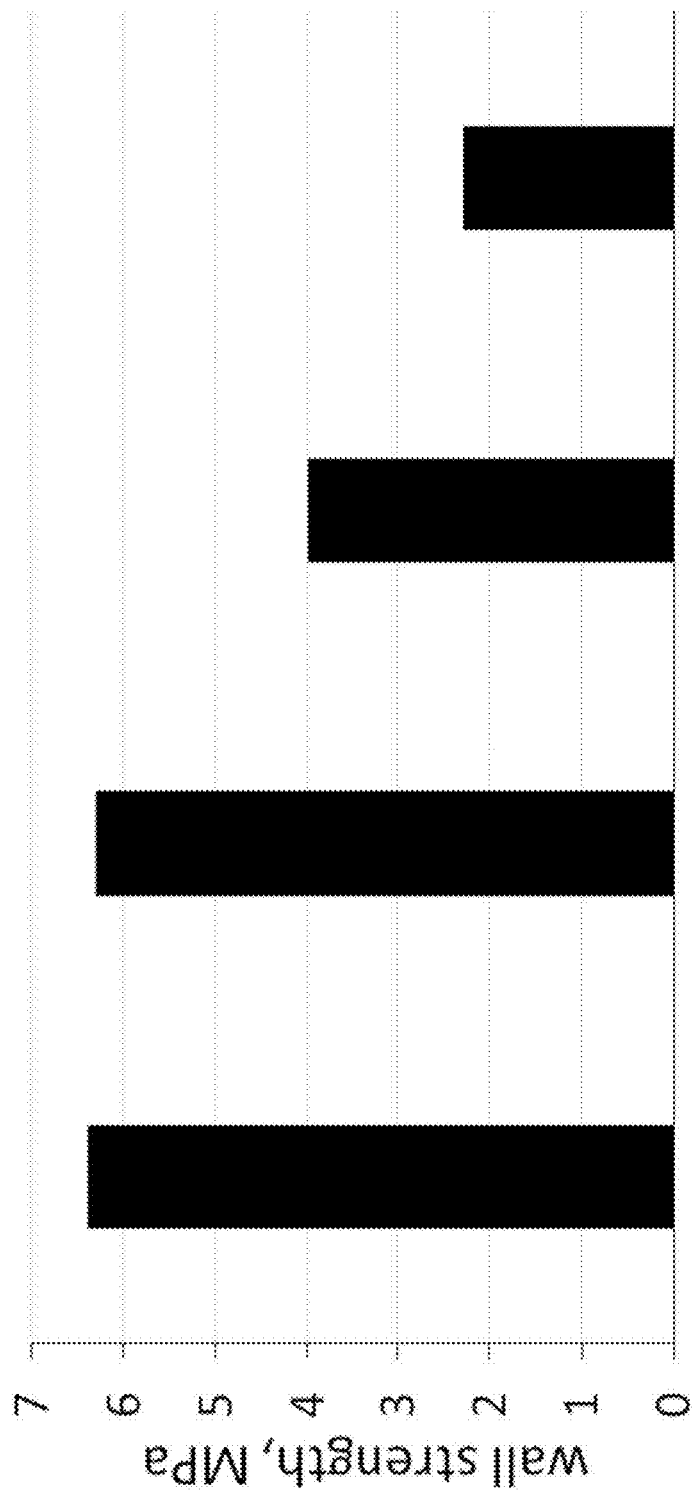
FIG. 6 is a graphical representation showing wall strength values, determined according to ASTM 1674-08, for monoliths produced from a starting mixture comprising Cu and monoliths where Cu was not present.

The wall strength, determined according to ASTM 1674-08 is shown in the diagram in FIG. 6.

The results for the pore analysis with mercury intrusion porosimetry are listed in table 2.

TABLE 2

|  | Accessible Porosity, % | modal pore diameter, μm |
|---|---|---|
| Example 1, before oxidation | 62.5 | 19.9 |
| Example 1, after oxidation | 57.5 | 19.8 |
| Example 1b, before oxidation | 63 | 20.5 |
| Example 1b, after oxidation | 61 | 19.6 |
| Example 2, before oxidation | 67.1 | 23.1 |
| Example 2, after oxidation | 62.35 | 22.55 |
| Example 2b, before oxidation | 65.8 | 23.1 |
| Example 2b, after oxidation | 65.5 | 22.65 |

The increase of the mechanical strength—for the examples with the lower porosity is not very high, but for the examples with more than 65% porosity it is significant. This means, that for the porosity level of 62% or lower, the mechanical strength is mainly a result of the interconnectedness of the 4H-SiC microstructure itself and for higher porosity level the mechanical strength can be improved significantly by the $SiO_2$ layer. The $SiO_2$ layer is thicker in the examples prepared by adding copper to the starting mixture. This is confirmed by the significant increase of the specific weight and by the significant decrease of the porosity after oxidation. The formation of the $SiO_2$ layer leads to the reduction of the width of the pore size distribution as the silica fills up very small pores. Thus, the formation of the $SiO_2$ layer narrows the distribution of the pore size. This can be seen in table 3, in which the D10, D50 and D90 values are listed before and after oxidation the examples 1 and 2.

TABLE 3

|  | D10, μm | D50, μm | D90, μm |
|---|---|---|---|
| Example 1, before oxidation | 13.8 | 19.14 | 24.28 |
| Example 1, after oxidation | 14.65 | 19.1 | 22.1 |
| Example 2, before oxidation | 17.62 | 22.7 | 27.25 |
| Example 2, after oxidation | 17.13 | 21.57 | 24.85 |

Figure 7:
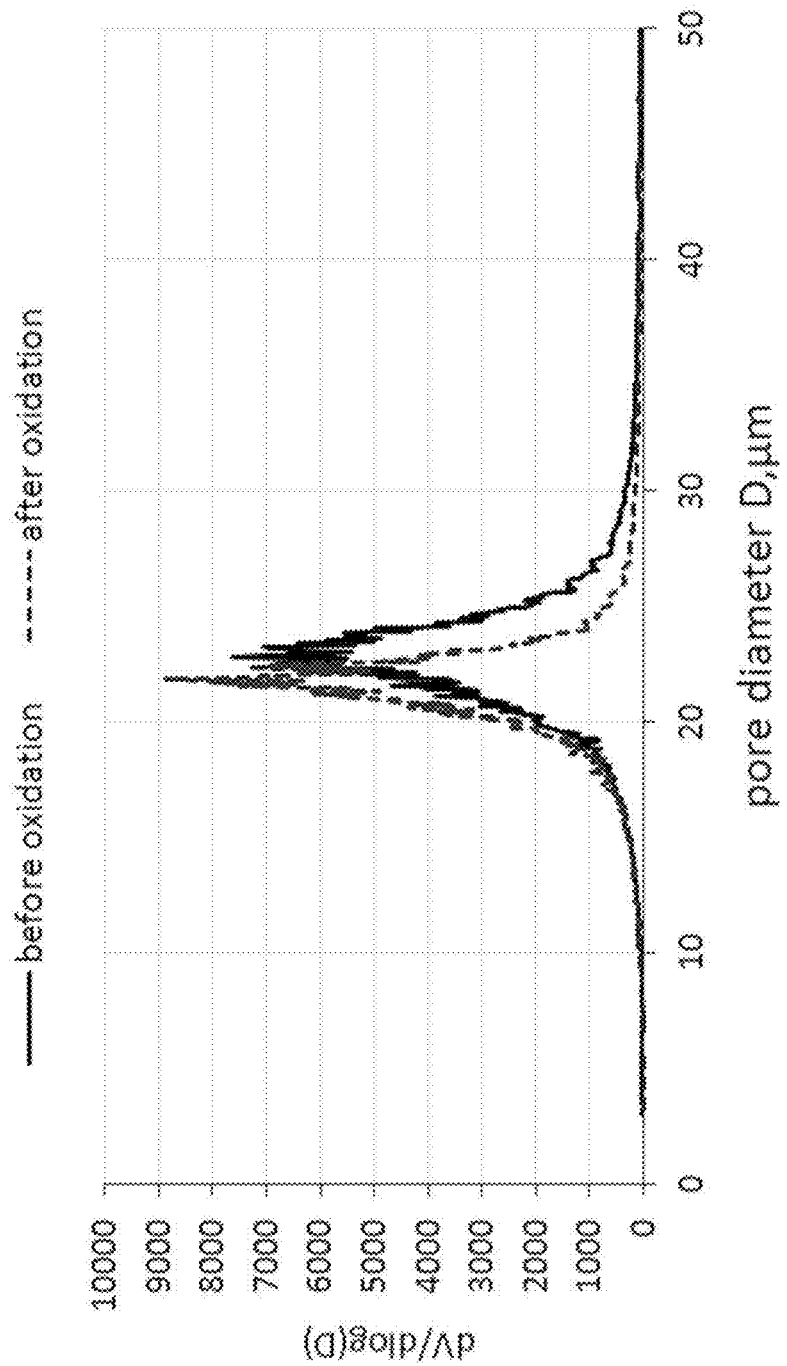
FIG. 7 shows the pore size distributions before and after oxidation for a monolith produced from a starting mixture comprising Cu.

The pore size distributions are plotted for the example 2 before and after oxidation in FIG. 7.

In particular, the presence of an alloy forming agent comprising Cu in the starting mixture results in a porous alpha-silicon carbide product characterized by a modal pore diameter between 19 and 24 μm, by a silicon oxide protection layer having a thickness between 50 and 100 nm, having an increase in weight after the oxidation step between 6 and 7%, a significant increase in mechanical strength when the porosity is higher than 65% following the oxidation step and the absence or limited presence of large ternary carbide crystals.

The impact of the copper on the oxidation of the SIC and the resulting build up of a $SiO_2$ layer has been investigated by oxidation trials. Samples of honey combs prepared according to example 2 and 2b have been taken after temperature step III, i.e. after the siliconization and recrystallization step. These samples have been oxidized in different steps and after each step the change in specific weight, porosity and pore volume has been investigated. The following oxidation steps have been performed:
1. 4 hours at 950° C.;
2. 4 hours at 1100° C.;
3. 4 hours at 1100° C.

Figure 8A:
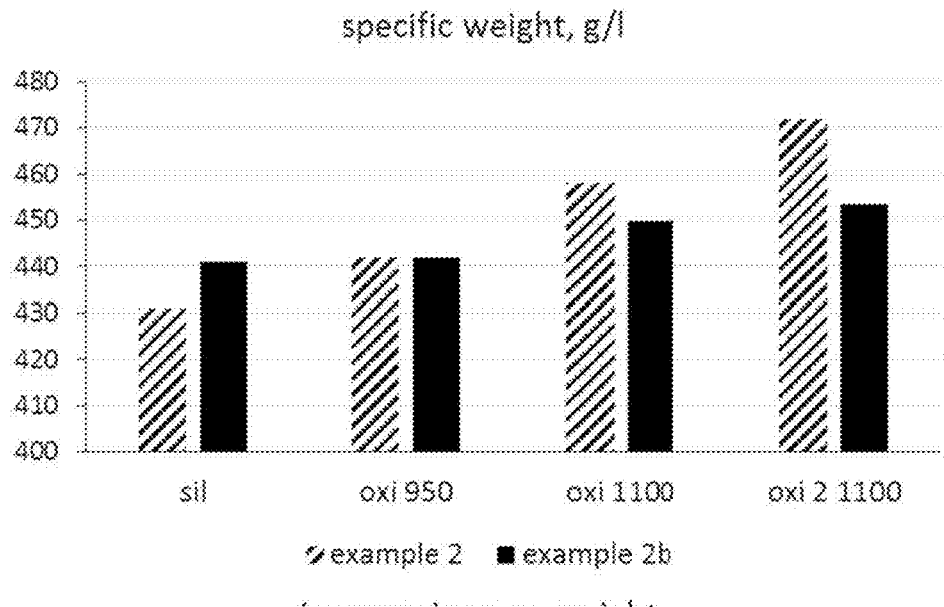
FIG. 8A-C are graphical representations showing the specific weight before oxidation and after each oxidation step, i.e.
Figure 8B:
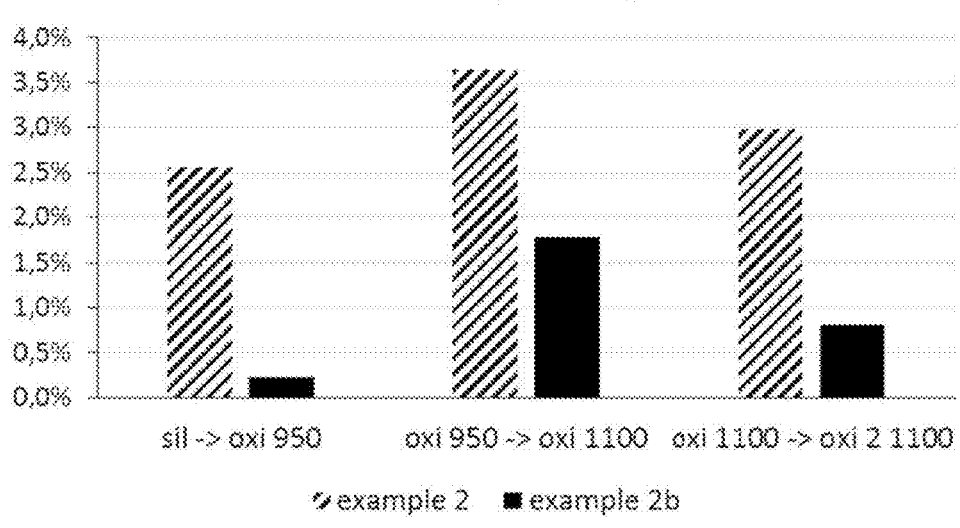
Figure 8C:
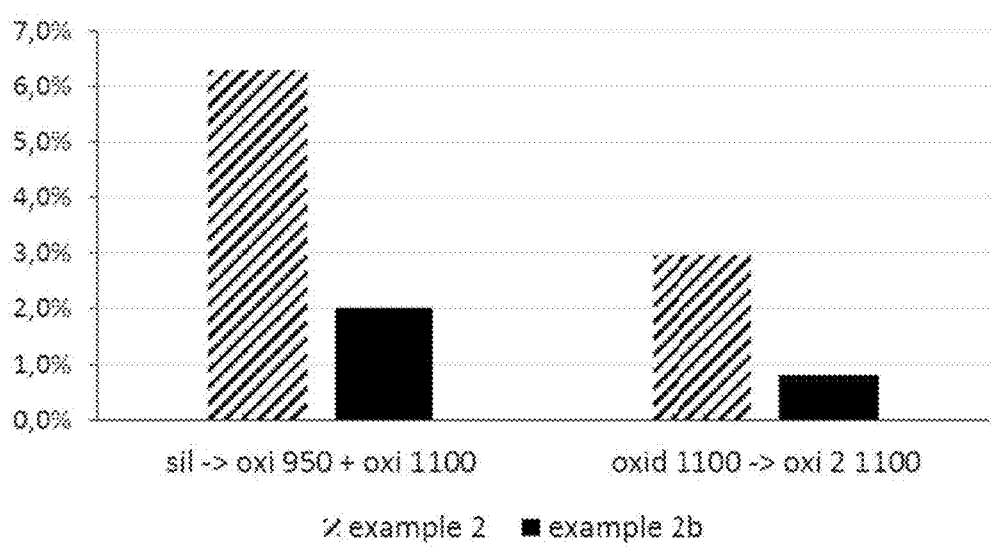

The specific weight before oxidation and after each oxidation step are shown in FIG. 8A, the differential increase after each step is shown in FIG. 8B and in FIG. 8C the first two oxidation steps are accumulated in comparison to FIG. 8B. One can clearly see, at the end of the step at 950° C., a significant weight increase is produced for the copper-containing example 2 when compared to the example 2b without copper. Without copper a significant weight increase can be observed at the second oxidation step at 1100° C. At this oxidation step, the copper containing sample shows a higher weight increase. These results clearly show, that the copper strongly promotes the oxidation of the SIC. The differential increase of the specific weight between the different oxidation steps as shown in FIG. 8C shows that this accelerated oxidation also decreases with subsequent oxidation.

Figure 9A:
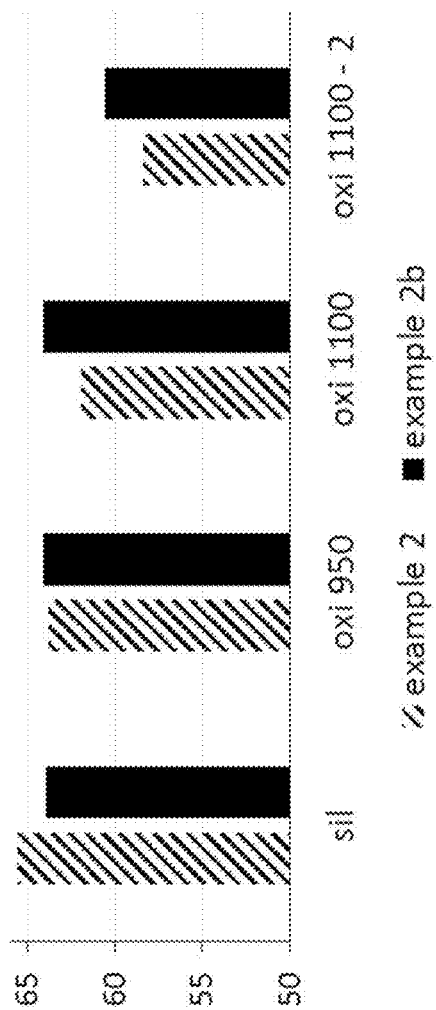
FIG. 9A is a graphical representation showing the measured porosities of the different samples after each oxidation step.
Figure 9B:
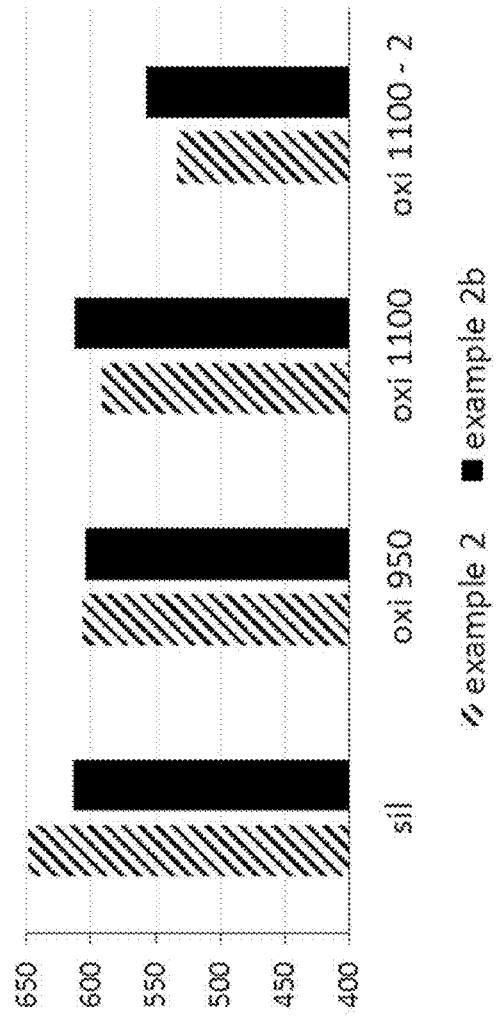
FIG. 9B is a graphical representation showing the total pore volumes corresponding to the porosities measured in FIG. 9A.

The measured porosities of the different samples after each oxidation step are shown in FIG. 9A. The corresponding total pore volumes are shows in FIG. 9B. These results correspond very well with the results shown in FIGS. 8 A-C. The total accessible porosity and the corresponding total pore volume is reduced by each oxidation step.

Example 3

An extrusion batch mixture was created according to recipe of example 1.

| Electrode graphite 0-40 μm | 17% |
|---|---|
| Liquid starch | 8.35% |
| Metallic Silicon 20-75 μm | 44% |
| Aluminum flakes | 4.8% |
| Metallic copper 0-50 μm | 1.15% |
| Methyl cellulose ether | 3.8% |
| Water | 20.4% |
| Polyoxyethylene | 0.5% |

This mix was filled into a piston extruder and extruded at a pressure of 70 bar at the extrusion die into a honey comb shape with a cell density of 200 cpsi and a wall thickness of 12 mil/305 μm. They have been cut to a length of 220 mm. The drying and complete heat treatment procedure to create a final oxidized SiC honey comb segment was exactly the same as described in example 1.

After the complete heat treatment steps samples have been taken for MIP.

The honey comb segments have been taken and cut to 203 mm length. The channels on each side have been closed alternatively on each side with a cement based on the composition of 64.5 weight-% SiC, 1 weight-% Methyl cellulose ether, 23.5 weight-% silica sol with 45% solid content and 11 weight-% of water in a way, that each open inlet channel is closed on the outlet and vice versa. These 49 mm×49 mm and 203 mm long filter segments have been used to assemble filter blocks of 3×3 segments. To glue the segments to each other the commercial cement IsoFrax DPF cement from the company UniFrax was used. This Filter block was then cut to a round shape with a Diameter of 143.5 mm. The outer skin was sealed using the same cement as for the assembling. After drying the whole filter block was hardened at 700° C. for 2 hours.

The resulting filter has had a diameter of 144 mm and a length of 203 mm.

Comparative Examples 3b

In addition to the examples 3 a comparative example 3b has been worked out. The honey comb samples have been prepared exactly according to the recipes given in example 3, except the fact, that the copper was left out.

The resulting segments have been assembled and cut out in the same way as in example 3 to build up a filter with a diameter of 144 mm and a length of 203 mm.

Evaluation of the Examples

The specific weight of the honey combs prepared according to the described examples are listed together with the values from the MIP analysis and the weights of the resulting assembled filters in table 4. Also listed in table 4 is the back pressure of the filters in a cold flow test (20° C., 1013 mbar) at an air flow of 800 m³/h. The surprising effect is, that the back pressure of both filters are at 800 m³/h on a similar level although the pore diameter and porosity of example 3 with the Copper as the additive is significantly lower.

TABLE 4

| | Spec. weight of segments after oxid., g/l | Weight of assembled filter, g | Mean pore diameter, μm | porosity, % | back pressure of the filter at 800 m³/h, mbar |
|---|---|---|---|---|---|
| Example 3 | 472 | 1845 | 12 | 52 | 62 |
| Example 3b | 456 | 1776 | 17 | 60 | 67 |

The filters have been tested on an engine bench test.
The test setup is described below:
Engine: VM Motori R425 with 2.5 displacement.
T250 engine dynamometer
Condensation Particle Counter from TSI The back pressure as tested at different load points. This was done with the fresh filters as well as with the filters at a soot load level of 5 g/l. In table 5 the results are listed for the two examples.

TABLE 5

Back pressure at different load points for the filters according to examples 3 and 3b fresh and at a soot load level of 5 g/l.

| Filter Example 3, fresh | | | Filter Example 3, at 5 g/l soot load | | |
|---|---|---|---|---|---|
| T °C. | exhaust mass flow kg/h | back pressure kPa | T °C. | exhaust mass flow kg/h | back pressure kPa |
| 459.9 | 233.8 | 4.0 | 470.6 | 214.7 | 16.0 |
| 418.4 | 210.9 | 3.4 | 432.4 | 195.8 | 14.0 |
| 346.9 | 184.6 | 2.6 | 357.9 | 175.3 | 11.4 |
| 204.7 | 153.1 | 1.6 | 212.8 | 150.4 | 8.0 |
| 117.3 | 60.9 | 0.3 | 121.9 | 60.9 | 2.7 |

| Filter Example 3b, fresh | | | Filter Example 3b, at 5 g/l soot load | | |
|---|---|---|---|---|---|
| T °C. | exhaust mass flow kg/h | back pressure kPa | T °C. | exhaust mass flow kg/h | back pressure kPa |
| 452.5 | 234.6 | 3.7 | 524.8 | 220.1 | 23.5 |
| 411.2 | 212.2 | 3.1 | 462.9 | 196.8 | 20.2 |
| 342.5 | 185.8 | 2.3 | 375.3 | 174.7 | 16.7 |
| 202.1 | 153.8 | 1.4 | 220.4 | 148.9 | 11.9 |
| 117.0 | 61.8 | 0.3 | 121.3 | 61.6 | 4.1 |

Figure 10:
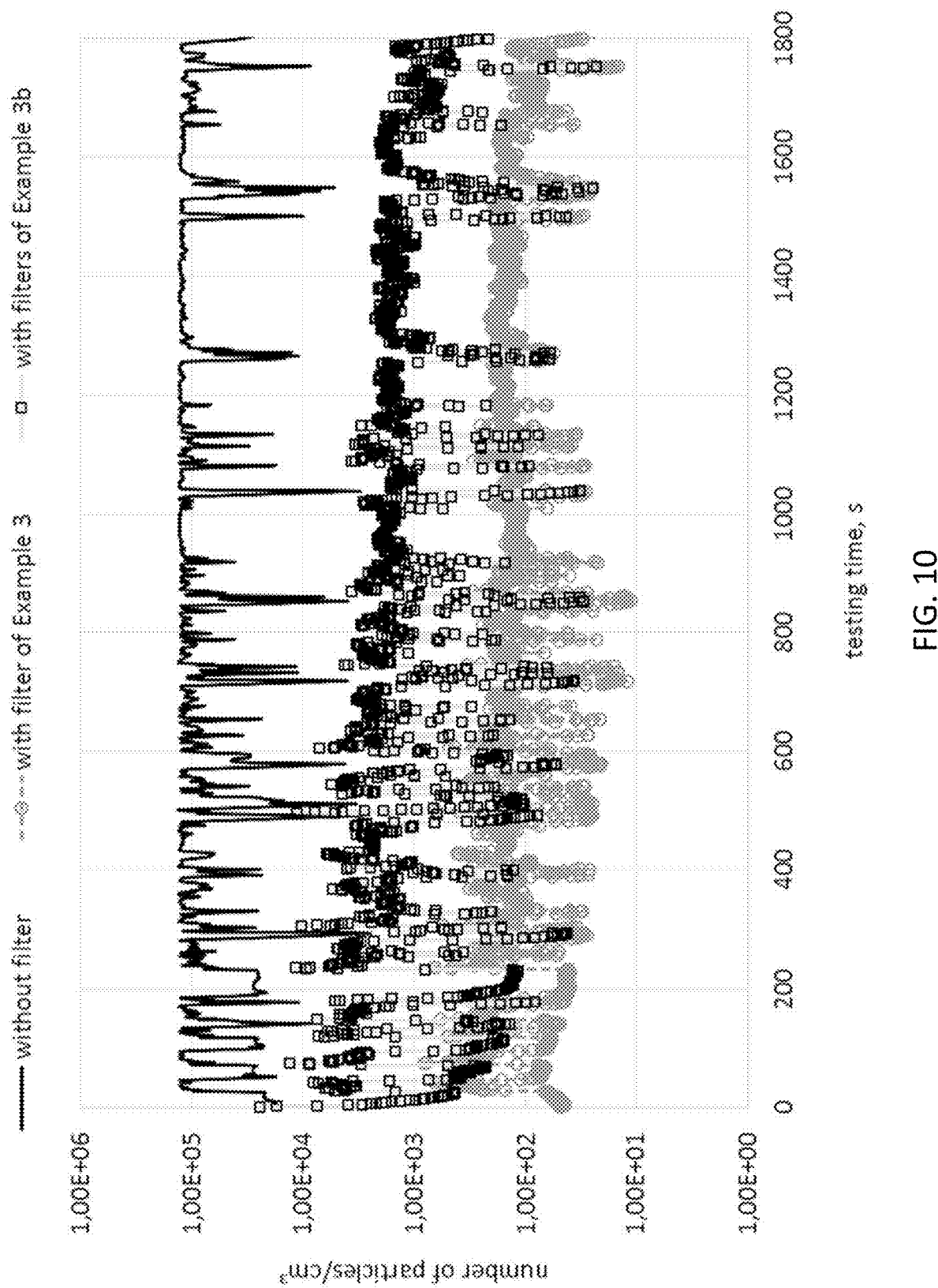
FIG. 10 is a graphical representation of the measured particle numbers in the exhaust mass flow over a European Transient Test Cycle with and without the filters.

Again, both filters show fresh (without or with very low soot load) a similar back pressure but after a loading to 5 g/l the filter of example 3 shows a much lower increase under soot load. This is an effect of the different structure caused by the copper additive: the smaller pores lead to a reduced deep bed filtration and therefore to a faster build up of a soot layer on the inlet surface of the filter channels. The reduced deep bed filtration causes the significant lower back pressure under soot load in comparison to the structure without copper additive of example 3b This is a clear advantage of the structure created with Copper as the additive. After the back pressure test of the fresh filters the filtration efficiency was tested running an European Transient Test cycle (ETC). This test was done before the soot load up to 5 g/l. The measured particle numbers in the exhaust mass flow with and without the filters is shown in the diagram in FIG. 10. One can clearly see that the filter according to Example 3 shows a better filtration right from the beginning. The accumulated particle numbers over the whole test cycle led to the following filtration performance:

Filter Example 3: 99.9% filtration efficiency
Filter Example 3b: 98.3% filtration efficiency This means that a Diesel particle filter according to Example 3 and therefore according to this invention shows improved filtration performance and soot load characteristic in comparison to a corresponding filter without the copper as the additive.

Figure 11:
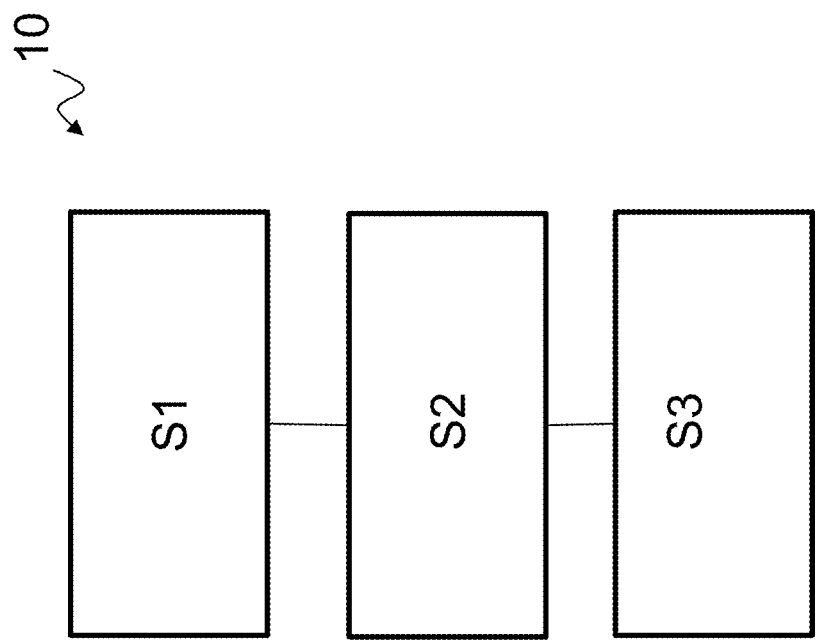
FIG. 11 is a workflow of the method according to one aspect of the invention.

FIG. 11 is a workflow of the method according to one aspect of the invention. The method (10) of producing a porous silicon carbide product comprises the steps:

(S1) preparing a mixture comprising silicon, carbon, at least one silicide forming and carbide forming agent and at least one alloy forming agent;
(S2) producing a monolith structure by processing the mixture;
(S3) applying heating to the monolithic structure.

The method of producing a porous silicon carbide product may further comprise the step (S4), i.e. exposing the heat treated porous silicon carbide product to acidic environment.

This step (S4) as the effect of removing, at least partially, undesired oxides. For example, when an alloy forming agent comprising Cu is used in the stating mixture, CuO may be formed.

In general, CuO may have a desired catalytic activity. CuO in combination with $CeO_2$ can reduce $NO_x$ to $N_2$ and water and generate ammonia in a high oxygen content gas flow. This effect is advantageous if a SCR catalyst is deposited on the porous SIC according to this invention. On the other hand CuO can also produce unwanted by-products, like dioxines, when the porous silicon carbide product is used as DPF with a special type of fuel like Biodiesel. In this case it is advantageous to remove at least a part of the CuO from the surface of the porous SiC.

Removal of at least part of the CuO from the surface of the porous SIC may have the benefit of reducing the oxidation performance after the initial oxidation at 1100° C. (heat treatment III). This could be necessary if the porous SIC is used as a DPF in applications with severe regeneration conditions which produce temperature peaks inside the DPF of 1100° C. or higher. In this case it would be optimal to reduce the amount of CuO on the SIC surface to a minimum.

Removal of at least part of the CuO from the SIC surface is not straightforward. According to the invention removal of the CuO may be achieved in acidic media, such as mineral or organic acids with and without additional oxidizing agents. For example, removal of CuO was performed on the sample prepared according to example 2. Following the final oxidation step at 1100° C., the sample was placed into nitric acid at a concentration of 65% at a temperature of 65° C. for 4 hours. After this the sample was washed with demineralized water and dried. This treatment resulted in a weight decrease of 0.7%. The sample was subsequently oxidized again at 1100° C. for 5 hours. This oxidation led to a weight increase of only 0.5%, i.e. the oxidation performance was reduced to a minimum.

Other examples of acidic media may be hot (about 80 Celsius) aqueous mixture of HCl(aq) and cupric chloride $CuCl_2$(aq).

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of producing a porous silicon carbide product, said method comprising:

preparing a mixture comprising silicon, carbon, at least one silicide forming and carbide forming agent and at least one alloy forming agent; wherein said at least one silicide forming and carbide forming agent comprises a group 13 element, or a group 12 element, or a group 2 element; wherein said at least one alloy forming agent comprises Cu;

producing a monolith structure by processing said mixture;

applying heating to said monolithic structure, wherein said applying heating comprises performing pyrolysis of said produced monolithic structure in a controlled atmosphere at a temperature between 700 and 1000° C. for a period between 1 and 24 h;

wherein said applying heating further comprises:
   applying to said produced monolithic structure at least three temperature treatments wherein the temperature is varied between room temperature and 2100° C., said room temperature being about 20 to 26° C. with an average of 23° C., wherein said at least three temperature treatments comprise:

a first temperature treatment between 850 and 1500° C. for a period between 1 and 24 h in inert atmosphere or vacuum;

a second temperature treatment between 1500° C. and 2100° C. and back to room temperature for a period between 1 and 24 h in a controlled atmosphere; and a third temperature treatment between room temperature up to 1150° C. and back to room temperature in an oxidizing atmosphere;

and wherein said at least one alloy forming agent is, after performing said pyrolysis, in a concentration between 0.1 and 0.9 at. %.

2. The method according to claim 1, wherein said group 13 element is Al.

3. The method according to claim 1, wherein said group 12 element is Zn.

4. The method according to claim 1, wherein said group 2 element is Mg.

5. The method according to claim 1, wherein said at least one alloy forming agent is an alloy forming agent supporting oxidation of silicon carbide.

6. The method according to claim 1, further comprising: exposing said heat treated porous silicon carbide product to acidic environment.

7. The method according to claim 1, further comprising: depositing a catalyst onto said temperature treated monolithic structure.

8. The method according to claim 1, wherein said processing is by extrusion or by application of pressure to said mixture.

* * * * *